Figure 1:
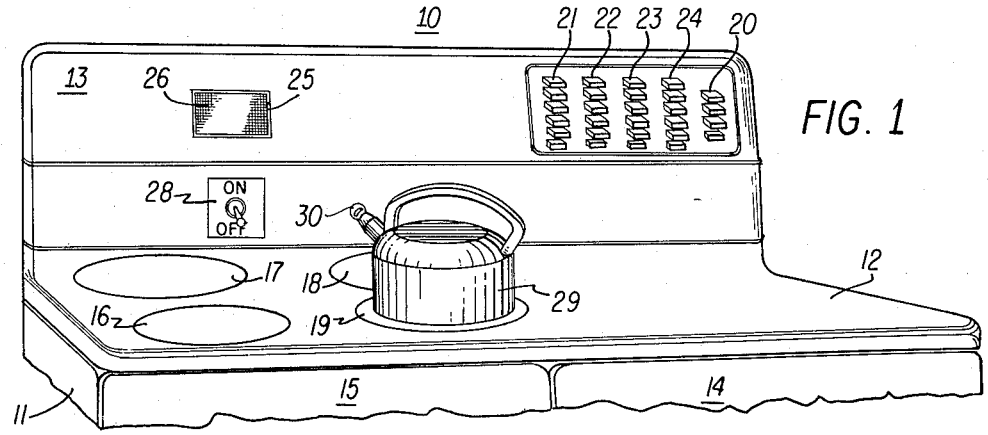

Jan. 26, 1954 W. C. CLARK 2,667,560
HEATING CIRCUIT CONTROL FOR ELECTRIC APPLIANCES
Filed Dec. 5, 1952 2 Sheets-Sheet 1

INVENTOR.
William C. Clark
BY
Smith, Olsen & Baird
Attys.

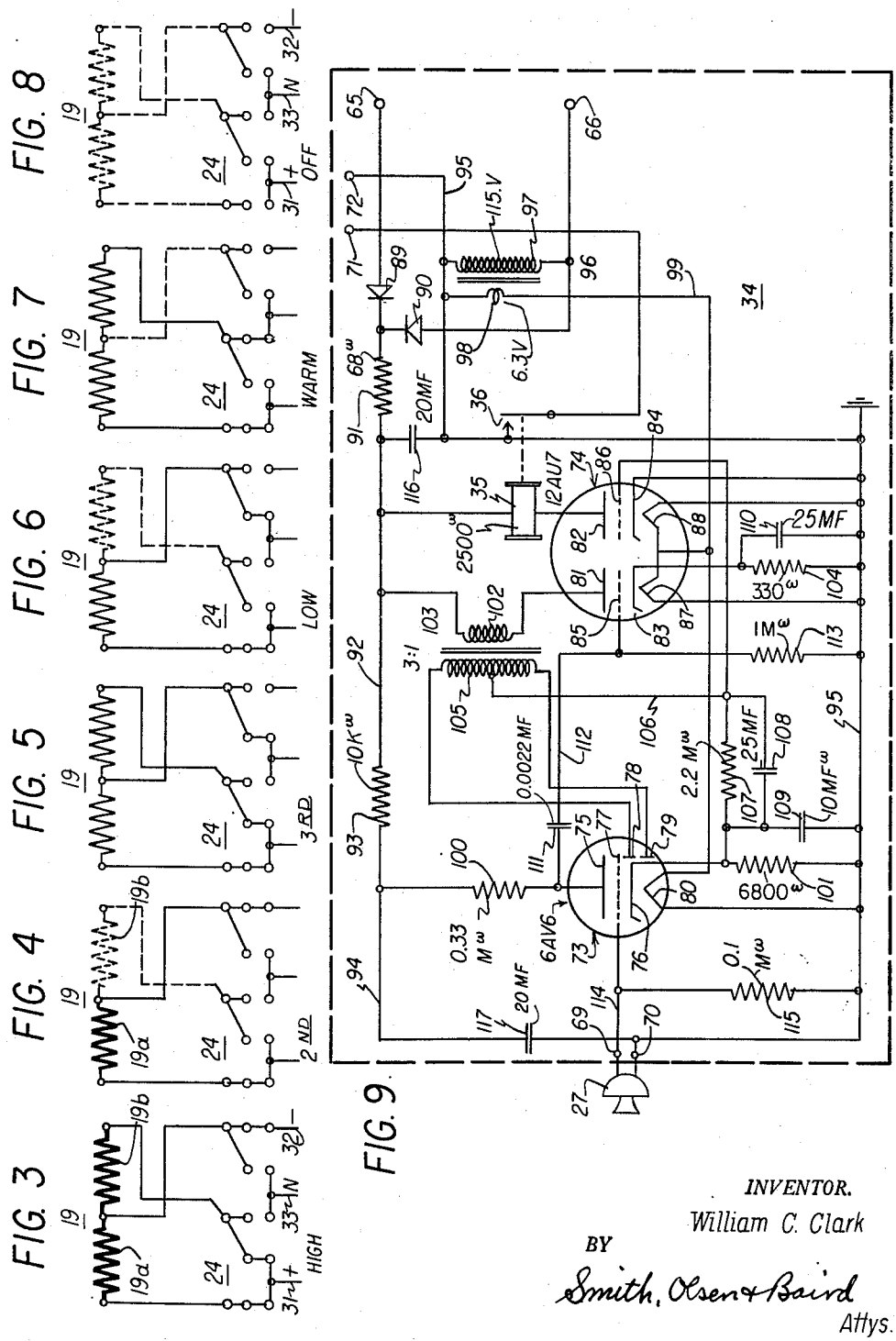

Patented Jan. 26, 1954

2,667,560

UNITED STATES PATENT OFFICE 2,667,560

HEATING CIRCUIT CONTROL FOR ELECTRIC APPLIANCES

William C. Clark, Owensboro, Ky., assignor to General Electric Company, a corporation of New York Application December 5, 1952, Serial No. 324,360

12 Claims. (Cl. 219—20)

The present invention relates to heating circuit controls for electric appliances, and more particularly to improved circuit controls for electric ranges of the general character disclosed in United States Patent No. 2,613,289, granted on October 7, 1952, to Roland O. Warner.

The electric range disclosed in this Warner patent comprises a cooking top carrying a heating unit, a backsplash carrying a manually operable control switch of the push-button type, and a source of current supply of the three-wire Edison type. The control switch is provided with a plurality of individual pushbuttons selectively operative in order to establish a corresponding plurality of different electrical heating connections between the heating unit and the source of current supply so as to effect heating of the heating unit at a corresponding plurality of different heating rates. Also, the range comprises an electroresponsive motor operatively associated with the low pushbutton, a vessel provided with a handle and operatively supported by the heating unit, and a flexible cable that is connected between a first receptacle carried in the outer end of the handle and a second receptacle carried by the backsplash. The cable forms a part of the control circuit for the motor that also includes a thermal switch carried by the vessel and responsive to the temperature of the contents thereof.

In the operation of the range, the food to be cooked is placed in the vessel; the vessel is supported upon the heating unit; and the cable is attached between the first and second receptacles mentioned. Then the high pushbutton is operated so that heat is supplied at a high rate to the heating unit in order to prepare the motor for operation and to cause the food contained in the vessel to be heated quickly to a cooking temperature; whereupon the thermal switch controls the circuit in order that the prepared motor is operated to effect operation of the low pushbutton so that heat is supplied at a low rate to the heating unit. Accordingly, the food contained in the vessel is quickly heated to the cooking temperature and is then maintained thereat to produce a gentle cooking action.

While this range is entirely satisfactory in operation, it is subject to the criticism that the control circuit therefor includes the flexible cable extending between the outer end of the handle of the vessel and the backsplash, and this cable must be connected in order to preserve the automatic control of the heating circuit.

Accordingly, it is a general object of the present invention to provide in an electric range of the type noted, an improved arrangement for automatically controlling the heating circuit thereof that requires no cable or other electrical attachments between the cooking vessel and the backsplash.

Another object of the invention is to provide in a cooking appliance, a heating control arrangement that is responsive to sound produced as a result of vigorous cooking of the contents of a vessel operatively associated with the heating unit for automatically reducing the heat supplied to the heating unit so as subsequently to produce gentle cooking of the contents of the cooking vessel.

A further object of the invention is to provide in a cooking appliance, a sonic heating control arrangement of the character noted, wherein the control circuit is prepared in response to operation of the manual control switch for the heating unit into its high heating position, and controlled in response to sound produced as a result of vigorous cooking of the contents of the cooking vessel associated with the heating unit to operate the control switch into its low heating position.

A further object of the invention is to provide in a cooking appliance, a sonic heating control system of the character noted that includes an amplifier and a power supply circuit and that is so arranged that the power supply circuit is closed and opened in the respective high-heat and low-heat positions of the control switch for the heating unit.

A still further object of the invention is to provide in an electric range, a sonic heating control system that includes the combination of a cooking vessel provided with a whistle and a microphone responsive to sound produced by the whistle to govern the control switch for the heating unit.

Further features of the invention pertain to the particular arrangement of the elements of the heating control circuit of the cooking appliance, whereby the above-outlined and additional operating features thereof are attained.

Figure 2:
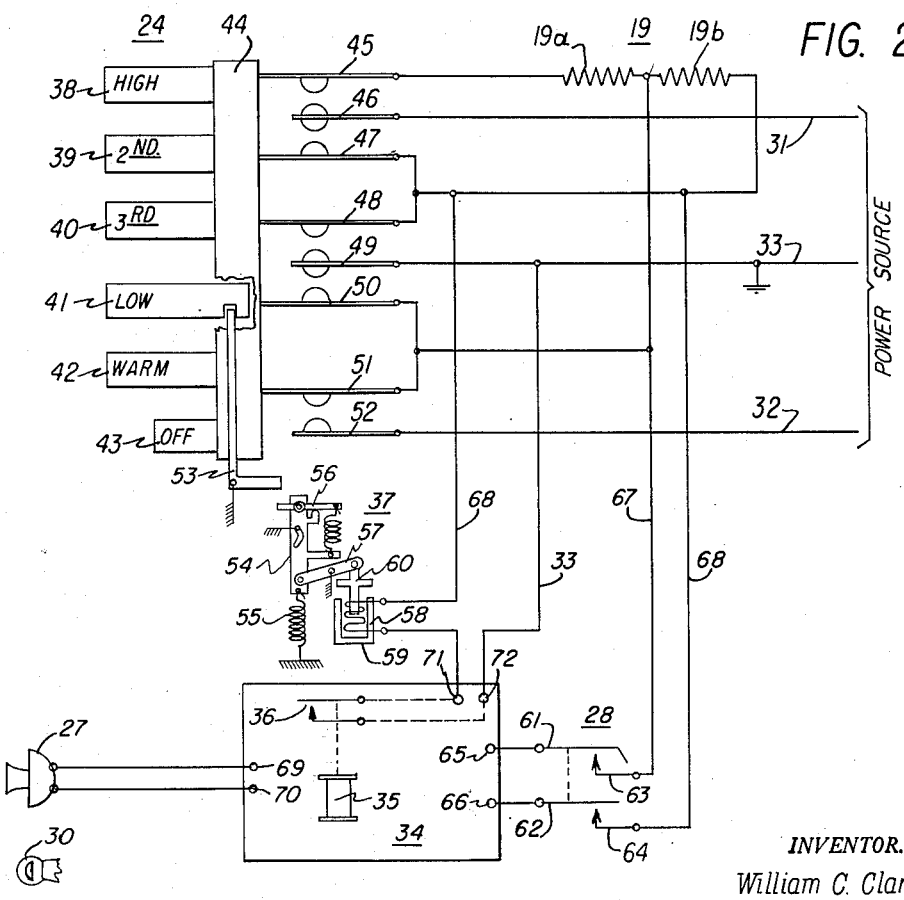

The invention, both as to its organization and method of operation, together with further objects and advantages thereof, will best be understood by reference to the following specification taken in connection with the accompanying drawings, in which Figure 1 is a fragmentary front perspective view of the upper portion of an electric range incorporating a heating control circuit embodying the present invention;

Figure 2 is an electric diagram of the heating control circuit, indicating that it includes a heating unit, a control switch, a source of current supply, an amplifier and a microphone;

Figs. 3 to 8, inclusive, are electric diagrams of the different heating connections that are set-up in the heating control circuit between the heating unit and the source of current supply in the corresponding different positions of the control switch, Figs. 3 to 8, inclusive, respectively illustrating the heating connections in the respective high, second, third, low, warm and off positions of the control switch; and Fig. 9 is an electric diagram of the circuit elements provided in the amplifier incorporated in the heating control circuit.

Referring now to Figure 1 of the drawings, the electric range 10 there illustrated incorporates a heating control circuit embodying the features of the present invention and comprises an upstanding body 11 provided with a substantially horizontally disposed cooking top 12 terminating adjacent to the rear thereof in an upstanding hollow backsplash 13. The body 11 comprises an oven disposed in the right-hand portion thereof below the cooking top 12 and having an open front closed by a suitable door 14, and a storage space disposed in the left-hand portion thereof below the cooking top 12 and receiving movable drawer structure 15.

The left-hand upper surface of the cooking top 12 carries four surface heating units 16, 17, 18 and 19; the oven is provided with a heating circuit including a pushbutton control switch 20; and the heating units 16, 17, 18 and 19 are respectively provided with heating circuits respectively including pushbutton control switches 21, 22, 23 and 24. The pushbutton switches 20 to 24, inclusive, are suitably mounted upon the upper right-hand portion of the backsplash 13; and the heating units 16, 17, 18 and 19 are arranged in a substantially rectangular pattern upon the upper surface of the cooking top 12, and are hereinafter respectively referred to as the left front, left rear, right rear, and right front surface heating units. Accordingly in the range 10, it is the heating circuit of the right front surface heating unit 19 that includes the pushbutton control switch 24 that has been illustrated as embodying the features of the present invention.

Also an opening 25 is formed in the upper left-hand portion of the backsplash 13 that is covered by a foraminous member 26; and behind the member 26, and within the hollow backsplash 13, there is mounted a transducer or microphone 27, as indicated in Fig. 2. Further, a manually operable master switch 28 is mounted upon the backsplash 13 below the member 26 and employed for a purpose more fully explained hereinafter. Finally, the range 10 is provided with a cooking vessel 29 that may take the form of a kettle, covered sauce pan, or the like, and provided with a whistle indicated at 30.

Referring to Fig. 2, the heating control circuit for the right front surface heating unit 19 comprises, in addition to the control switch 24, the microphone 27 and the master switch 28, a source of current supply of the three-wire Edison type of 230-volts, single-phase A. C., and including two ungrounded outside line conductors 31 and 32 and a grounded neutral line conductor 33, as well as an amplifier indicated at 34 and including a control relay 35 governing a pair of contacts 36. The right front surface heating unit 19 includes two serially related sections 19a and 19b; while the control switch 24 is of the general construction and arrangement of that disclosed in United States Patent No. 2,431,904, granted on December 2, 1947, to John L. Andrews, and incorporating motor mechanism 37 for operating the low pushbutton thereof, as disclosed in the previously-mentioned Warner patent. Specifically, the control switch 24 comprises the high, second, third, low, warm and off pushbuttons 38 to 43, inclusive, as well as a supporting insulating housing 44 and eight switch springs 45 to 52, inclusive. The springs 46, 49 and 52 are stationary springs; and the springs 45, 47, 48, 50 and 51 are movable springs. More particularly, the springs 45 and 47 cooperate with the spring 46; the springs 48 and 50 cooperate with the spring 49; and the spring 51 cooperates with the spring 52. The springs 45, 47, 48, 50 and 51 are selectively operated in various combinations, as explained more fully hereinafter, by the mechanism arranged in the housing 44 to establish the various heating connections illustrated in Figs. 3 to 8, inclusive. Also, the mechanism arranged in the housing 44 is selectively operated by the pushbuttons 38, etc., selectively to control the operated combinations of the springs 45, 47, 48, 50 and 51; and moreover, the mechanism is responsive to operation of any one of the pushbuttons 38, etc., into its in position for returning any previously operated one of the pushbuttons 39, etc., back into its normal out position. Finally, the switch 24 comprises a pivotally mounted substantially L-shaped lever 53 linking the low pushbutton 41 with the mechanism 37, for a purpose more fully explained hereinafter.

The springs 46, 49 and 52 respectively terminate the line conductors 31, 33 and 32; the spring 45 terminates one terminal of the section 19a of the heating unit 19; the springs 47 and 48 commonly terminate one terminal of the section 19b of the heating unit 19; and the springs 50 and 51 commonly terminate the junction between the sections 19a and 19b. When the off pushbutton 43 occupies its operated position, the springs 45, etc., disengage the cooperating springs 46, etc., whereby all of the electrical connections are interrupted between the power source and the heating unit 19, as illustrated in Fig. 8. When the high pushbutton 38 occupies its operated position, the springs 45 and 47 are operated commonly to engage the spring 46 and the spring 51 is operated to engage the spring 52; whereby the sections 19a and 19b of the heating unit 19 are connected in parallel circuit relation across the outside line conductors 31 and 32 of the power source, as illustrated in Fig. 3. When the second pushbutton 39 occupies its operated position, the springs 45 and 51 are operated respectively to engage the springs 46 and 52; whereby the section 19a of the heating unit 19 is connected across the outside line conductors 31 and 32 of the power source, as illustrated in Fig. 4. When the third pushbutton 40 occupies its operated position, the springs 45 and 47 are operated commonly to engage the spring 46 and the spring 50 is operated to engage the spring 49; whereby the sections 19a and 19b of the heating unit 19 are connected in parallel circuit relation across the outside line conductors 31 and the neutral line conductor 33, as illustrated in Fig. 5. When the low pushbutton 41 occupies its operated position, the springs 45 and 50 are operated respectively to engage the springs 46 and 49; whereby the section 19a of the heating unit 19 is connected across the outside line conductor 31 and the neutral line conductor 33, as illustrated in Fig. 6. When the warm pushbutton 42 occupies its operated position, the springs 45 and 48 are operated respectively to engage the springs 46 and 49; whereby the sections 19a and 19b of the heating unit 19 are connected in series circuit relation across the outside line conductor 31 and the neutral line conductor 33, as illustrated in Fig. 7.

The mechanism 37 essentially comprises a member 54 mounted for guided sliding movement between a lower normal position and an upper operated position, the member 54 being biased into its lower normal position by an associated coil spring 55. The upper end of the member 54 carries a pivotally mounted lever 56, the outer left-hand end of which cooperates with the adjacent outer end of the arm of the lever 53; and the lower end of the member 54 is pivotally connected to the left-hand end of an element 57 that is pivotally mounted intermediate its ends. Also, the mechanism 37 includes an electroresponsive motor including a winding or solenoid 58 provided with field structure 59 and an associated movable armature 60, the upper end of the armature 60 being pivotally connected to the right-hand end of the element 57.

Considering the mode of operation of the mechanism 37, it will be understood that the member 54 is normally biased by the spring 55 into its normal position so that the lever 56 is disposed below the adjacent outer end of the arm of the lever 53; whereby the low pushbutton 51 is normally manually operable entirely independently of the mechanism 37. When the solenoid 58 is energized, the armature 60 is attracted so that the lever 57 moves the member 54 into its operated position; whereby the left-hand end of the lever 56 rides over the adjacent outer end of the arm of the lever 53; whereby the low pushbutton 51 is still manually operable independently of the mechanism 37. Now when the member 54 occupies its operated position and the solenoid 58 is deenergized, the spring 55 returns the member 54 from its operated position back into its normal position; and during the return movement of the member 54, the left-hand end of the lever 56 engages the adjacent outer end of the arm of the lever 53 rotating the lever 53 in the clockwise direction, as viewed in Fig. 2; whereby the low pushbutton 41 is operated into its in position. Accordingly, it will be understood that the energization and subsequent deenergization of the solenoid 58 brings about operation of the mechanism 37 so that the low pushbutton 41 of the control switch 24 is operated into its in position in order to establish the low heating connection between the power source and the heating unit 19 previously described and illustrated in Fig. 6.

The master switch 28 includes two movable blades 61 and 62 that respectively cooperate with two stationary contacts 63 and 64. The amplifier 34 includes two power supply terminals 65 and 66 that are respectively connected to the blades 61 and 62; while the contacts 63 and 64 are respectively connected to two conductors 67 and 68. The conductor 67 is commonly connected to the junction between the sections 19a and 19b of the heating unit 19 and to the springs 50 and 51 of the control switch 24; while the conductor 68 is commonly connected to the outside terminal of the section 19b of the heating unit 19, to the springs 47 and 48 of the control switch 24 and to one terminal of the solenoid 58. Also, the amplifier 34 includes two input terminals 69 and 70 that are respectively connected to the two terminals of the microphone 27, as well as two output terminals 71 and 72 that are respectively connected to the contacts of the pair 36, and respectively connected to the other terminal of the solenoid 58 and to the neutral line conductor 33.

Considering now the general mode of operation of the heating control circuit of the range 10, the food to be cooked is placed in the vessel 29; the vessel 29 is placed upon the surface heating unit 19; and the high pushbutton 38 of the control switch 24 is operated so as to establish the high heating connection between the power source and the heating unit 19, as previously described and as illustrated in Fig. 3; whereby the temperature of the food contained in the vessel 29 is quickly elevated to a cooking condition in order that steam is produced in the vessel 29 effecting operation of the whistle 30 as a consequence of the vigorous cooking of the food mentioned. Also, when the high pushbutton 38 of the control switch 24 is thus operated, power is supplied via the conductors 67 and 68 to the power supply terminals 65 and 66 of the amplifier 34, assuming that the master switch 28 occupies its on or closed position. When power is thus supplied to the amplifier 34, the circuit elements incorporated therein, and described in detail hereinafter, are controlled so that the relay 35 is operated to close its contacts 36; whereby a circuit is completed for energizing the solenoid 58 causing the mechanism 37 to be operated for the purpose of conditioning the low pushbutton 41 of the control switch 24 subsequently to be operated, in the manner previously explained. Now when the whistle 30 is operated after the short time interval mentioned, the microphone 27 is operated by the sound thus produced so that the circuit elements in the amplifier 34 are again controlled to bring about the restoration of the relay 35 and the consequent opening of the contacts 36; whereby the solenoid 58 is deenergized and the mechanism 37 is returned into its normal position operating the low pushbutton 41 of the control switch 24 into its in position through the lever 53. Accordingly, the control switch 24 is automatically operated by the arrangement above described, including the whistle 30, the microphone 27 and the amplifier 34, from its high position into its low position so that at this time the high heating connection of Fig. 3 is interrupted and the low heating connection of Fig. 6 is established. Shortly after the control switch 24 is thus operated into its low position, the vigorous cooking of the contents of the vessel 29 subsides and gentle cooking thereof proceeds for an appropriate time interval.

Of course, it will be understood that conventional manual control of the surface heating unit 19 by the control switch 24 may be preserved by operating the master switch 28 into its off or open position so as to disable the amplifier 34 and consequently the mechanism 37. Also, it is noted that when the control switch 24 is operated from its high heat position into its low heat position by the mechanism 37, the grounded neutral line conductor 33 is connected to the conductor 67 due to the engagement between the springs 50 and 49; and this ground potential is also applied through the section 19b of the heating unit 19 to the conductor 68, whereby power is removed from the supply terminals 65 and 66 of the amplifier 34 arresting further operation of the circuit elements therein, as explained more fully hereinafter.

The whistle 30 may have a pitch in the audio range of about 1500 cycles per second or it may have a pitch well above the audio range in the ultrasonic range above 20,000 cycles per second. In any case, the microphone 27 is tuned to the frequency of the whistle 30 so that it produces a considerable signal output at the tuned frequency for the purpose of rendering the microphone 27 selectively responsive thereto; which arrangement is very advantageous in view of the fact that the amplifier 34 is not falsely controlled by other kitchen sounds that may reach the microphone 27. Furthermore, the vessel 29 may take forms other than a kettle, as illustrated, such, for example, as a sauce pan provided with a removable cover, that, in turn, carries a whistle of the character described. This arrangement permits the microphone 27 to control the amplifier 34 for the purpose described when any one of a wide variety of cooking vessels is operatively associated with the surface heating unit 19.

Referring now to Fig. 9, the amplifier 34 comprises in addition to the terminals 65, 66, 69, 70, 71 and 72, and the relay 35 provided with the contacts 36, two tubes 73 and 74. The tube 73 is a combination triode and dual diode and may be of type 6AV6; and the tube 74 is a combination dual triode and may be of type 12AU7. The tube 73 includes a main anode 75, a main cathode 76, a control grid 77, two auxiliary anodes 78 and 79 and a cathode heater 80; while the tube 74 includes two anodes 81 and 82, two cathodes 83 and 84, two control grids 85 and 86, and two cathode heaters 87 and 88. The power supply terminals 65 and 66 are respectively connected through two selenium rectifiers 89 and 90 to one terminal of a resistor 91, the other terminal of the resistor 91 being connected to a power bus 92, that, in turn, is connected via a resistor 93 to another power bus 94. The output terminal 71 is directly connected to one of the contacts 36; while the other output terminal 72 is connected to a grounded bus 95. Accordingly, when power is supplied to the supply terminals 65 and 66, rectification is obtained producing appropriate plate voltages between the power busses 92 and 94 and the ground bus 95, the voltage between the power bus 92 and the ground bus 95 being higher than the voltage between the power bus 94 and the ground bus 95 by virtue of the series relation of the resistor 93, as will appear hereinafter. Also, the amplifier 34 includes a cathode heater transformer 96 provided with primary and secondary windings 97 and 98, the primary winding 97 being connected across the supply terminal 66 and the ground bus 95, and the secondary winding 98 being connected across a conductor 99 and the ground bus 95. The cathode heaters 80, 87 and 88 are connected in parallel circuit relation between the conductor 99 and the ground bus 95; whereby the respective cathodes 76, 83 and 84 are heated and rendered electron emissive in the usual manner.

The main anode 75 is connected through a load resistor 100 to the power bus 94; and the cathode 76 is connected through a biasing resistor 101 to the ground bus 95. The anode 81 is connected through the primary winding 102 of a load transformer 103 to the power bus 92; and the cathode 83 is connected through a biasing resistor 104 to the ground bus 95. The anode 82 is connected through the winding of the relay 35 to the power bus 92; and the cathode 84 is directly connected to the ground bus 95. The load transformer 103 also includes a secondary winding 105, the extremities of which are respectively connected to the auxiliary anodes 78 and 79, and the mid-tap thereof is connected to a conductor 106, that, in turn, is connected to the control grid 86. Also, the conductor 106 is connected via a resistor 107 to the cathode 76, the resistor 107 being bridged by a condenser 108. Also, the resistors 101 and 104 are respectively bridged by condensers 109 and 110. Further, the anode 75 is connected via a condenser 111 to a conductor 112, that, in turn, is connected to the control grid 85; and further a resistor 113 is connected between the conductor 112 and the ground bus 95. The input terminal 70 is directly connected to the ground bus 95; and the input terminal 69 is connected to a conductor 114, that, in turn, is connected to the control grid 77. Further, the input terminals 69 and 70 are bridged by a resistor 115. A filter condenser 116 is connected across the power bus 92 and the ground bus 95; and a filter condenser 117 is connected across the power bus 94 and the ground bus 95.

Considering now the operation of the amplifier 34, when power is supplied to the supply terminals 65 and 66, the plate voltages are established between the power buses 92 and 94 and the ground bus 95 by virtue of the full-wave rectifying action of the rectifiers 89 and 90, and the cathode heaters 80, 87 and 88 are energized, as previously explained. The right-hand side of the tube 74 is rendered conductive so that the winding of the relay 35 is energized causing it to operate and close its contacts 36 so that the output terminals 72 and 71 are connected together, for the purpose of effecting operation of the solenoid 58 incorporated in the mechanism 37, in the manner previously explained. Also, the left-hand side of the tube 74 is rendered conductive so that the primary winding 102 is energized. Further, the triode of the tube 73 is rendered conductive producing a load current through the load resistor 100. Finally, the two diodes of the tube 73 are conditioned to be conductive on positive half cycles of the respective voltages subsequently induced in the two sections of the secondary winding 105 of the transformer 103, as explained below. Specifically, at this time the bias applied to the cathode 76 is about plus one volt above ground; the bias applied to the cathode 83 is about plus 2.8 volts above ground; the bias applied to the control grid 86 is about minus 0.7 volt, with respect to the cathode 84; the bias applied to the control grid 85 is about 0 volt A. C. with respect to the cathode 83; and the bias applied to the control grid 77 is about 0 volt A. C. with respect to the cathode 76.

Now when the whistle 30 produces its sound, the microphone 27 is operated, and is preferably of the induction type, so that it alternately decreases and increases the bias or signal applied between thes control grid 77 and the cathode 76 of the tube 73 so that the amplified signal through the load resistor 100 is coupled through the condenser 111 to the conductor 112, and thus to the control grid 85 so as to vary the bias between the control grid 85 and the cathode 83 in the left-hand side of the tube 74. The amplified output of the left-hand side of the tube 74 is transformed as a result of the action of the load transformer 103; whereby heavy discharges are, at this time, thus alternately produced through the two diode sections of the tube 73 respectively including the auxiliary anodes 78 and 79. This heavy conduction between the auxiliary anodes 78 and 79 and the cathode 76 charges the condenser 108 so that the bias applied to the control grid 86 is increased thereby reducing the plate current in the right-hand side of the tube 74 to a flow such that insufficient current traverses the winding of the relay 35 to retain the latter relay in its operated position. The relay 35, being of the marginal type, restores interrupting, at its contacts 36, the connection between the output terminals 71 and 72 so that the solenoid 58 of the mechanism 37 is deenergized; whereby the mechanism 37 is returned into its normal position operating the control switch 24 from its high position into its low position, in the manner previously explained. When the control switch 24 is thus returned into its low position, the supply of power to the supply terminals 65 and 66 is interrupted; whereby all of the electrical elements in the amplifier 34 are returned into their normal inactive positions.

In passing, it is noted that by appropriately selecting the capacitance of the condenser 108, and the resistance of the resistor 107 the charge-time interval of the condenser 108 may be appropriately set so that the microphone 27 must respond to the sound of the whistle 30 for a corresponding time interval in order to bring about the restoration of the relay 35, in the manner described above. This arrangement prevents the microphone 27 from responding falsely to a stray kitchen sound of the approximate pitch of the whistle 30, but of a short time duration. In other words, by determining the capacitance of the condenser 108, and the resistance of the resistor 107 as noted, the amplifier 34 can be so adjusted that the microphone 27 must respond to the sound of the predetermined and tuned pitch for a time interval of several seconds before bringing about appropriate charging of the condenser 108 so as to govern the bias applied to the control grid 86 such that the relay 35 will restore in the manner described above.

In view of the foregoing, it is apparent that there has been provided in an electric range, an improved arrangement for automatically controlling the heating circuit that requires no cable or other electrical attachments between the cooking vessel operatively associated with the heating unit and the backsplash thereof, which arrangement utilizes a sonic control for the purpose noted.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a cooking appliance including a heating unit, a source of current supply, and a unitary manually operable control switch selectively operative into a plurality of different positions in order to establish a corresponding plurality of different electrical heating connections between said heating unit and said source so as to effect heating of said heating unit at corresponding different heating rates; the combination comprising mechanism operative to operate said switch into a first of its positions, means responsive to operation of said switch into a second of its positions for preparing said mechanism, said second position of said switch effecting heating of said heating unit at a higher rate than said first position of said switch, a microphone operative in response to sound produced as a result of vigorous cooking of the contents of a vessel operatively associated with said heating unit, and means responsive to operation of said microphone for operating said prepared mechanism.

2. In a cooking appliance including a heating unit, a source of current supply, and a unitary manually operable control switch selectively operative into a plurality of different positions in order to establish a corresponding plurality of different electrical heating connections between said heating unit and said source so as to effect heating of said heating unit at corresponding different heating rates; the combination comprising mechanism operative to operate said switch into a first of its positions, means responsive to operation of said switch into a second of its positions for preparing said mechanism, said second position of said switch effecting heating of said heating unit at a higher rate than said first position of said switch, a cooking vessel supported in heat exchange relation with said heating unit and carrying a whistle that is operative to produce a sound in response to vigorous boiling of the contents thereof, a microphone operative in response to the sound produced by said whistle, and means responsive to operation of said microphone for operating said prepared mechanism.

3. The cooking appliance combination set forth in claim 2, wherein said whistle has a predetermined pitch and said microphone is tuned to operate in response to said predetermined pitch.

4. The cooking appliance combination set forth in claim 3, wherein said predetermined pitch is in the audio range.

5. The cooking appliance combination set forth in claim 3, wherein said predetermined pitch is in the ultrasonic range.

6. In a cooking appliance including a heating unit, a source of current supply, and a unitary manually operable control switch of the pushbutton type provided with a plurality of individual pushbuttons selectively operative in order to operate said switch into a corresponding plurality of different positions to establish a corresponding plurality of different electrical heating connections between said heating unit and said source so as to effect heating of said heating unit at a corresponding plurality of different heating rates; the combination comprising mechanism operative to operate a first of said pushbuttons, means responsive to operation of a second of said pushbuttons for preparing said mechanism, the second position of said switch corresponding to said second push-button effecting heating of said heating unit at a higher rate than the first position of said switch corresponding to said first pushbutton, a microphone operative in response to sound produced as a result of vigorous cooking of the contents of a vessel operatively associated with said heating unit, and means responsive to operation of said microphone for operating said prepared mechanism.

7. In a cooking appliance including a heating unit, a source of current supply, and a unitary manually operable control switch selectively operative into a plurality of different positions in order to establish a corresponding plurality of different electrical heating connections between said heating unit and said source so as to effect heating of said heating unit at a corresponding plurality of different heating rates; the combination comprising an electro-responsive motor operative to operate said switch into a first of its positions, a circuit for said motor, means responsive to operation of said switch into a second of its positions for closing a point in said circuit, said second position of said switch effecting heating of said heating unit at a higher rate than said first position of said switch, a microphone operative in response to sound produced as a result of vigorous cooking of the contents of a vessel operatively associated with said heating unit, means responsive to operation of said microphone for controlling said circuit to operate said motor, and means responsive to operation of said switch into said first position for opening a point in said circuit.

8. In a cooking appliance including a heating unit, a source of current supply, and a unitary manually operable control switch selectively operative into a plurality of different positions in order to establish a corresponding plurality of different electrical heating connections between said heating unit and said source so as to effect heating of said heating unit at a corresponding plurality of different heating rates; the combination comprising mechanism operative to operate said switch into a first of its positions, means responsive to operation of said switch into a second of its positions for preparing said mechanism, said second position of said switch effecting heating of said heating unit at a higher rate than said first position of said switch, an amplifier provided with an input circuit and an output circuit and a supply circuit, means responsive to operation of said switch into said second position for connecting said source to said supply circuit and responsive to operation of said switch into said first position for disconnecting said source from said supply circuit, a microphone connected to said input circuit and responsive to sound produced as a result of vigorous cooking of the contents of a vessel operatively associated with said heating unit to produce an input signal therein, and a relay connected to said output circuit and governed by an output signal therein to operate said prepared mechanism, said amplifier being controlled by an input signal in said input circuit to produce an output signal in said output circuit when said source is connected to said supply circuit.

9. In an electric range including a cooking top, a backsplash, a heating unit carried by said cooking top, a source of current supply, and a unitary manually operable control switch carried by said range and selectively operative into a plurality of different positions in order to establish a corresponding plurality of different electrical heating connections between said heating unit and said source so as to effect heating of said heating unit at a corresponding plurality of different heating rates; the combination comprising mechanism operative to operate said switch into a first of its positions, means responsive to operation of said switch into a second of its positions for preparing said mechanism, said second position of said switch effecting heating of said heating unit at a higher rate than said first position of said switch, a microphone carried by said backsplash and operative in response to sound produced as a result of vigorous cooking of the contents of a vessel supported by said heating unit, and means responsive to operation of said microphone for operating said prepared mechanism.

10. The electric range combination set forth in claim 9, wherein said microphone is mounted within said backsplash adjacent to an opening formed in the front thereof, and said opening is covered by a foraminous member.

11. The electric range combination set forth in claim 9, and further comprising a manually operable master controller carried by said backsplash for selectively disabling said mechanism.

12. In a cooking appliance including a heating unit, a controller having an off position and a high position and a low position, means responsive to operation of said controller into its respective high and low positions for supplying heat to said heating unit at respective high and low rates, and manually operable means for selectively operating said controller; the combination comprising a transducer operative in response to sound produced as a result of vigorous cooking of the contents of a vessel operatively associated with said heating unit, mechanism operative to operate said controller from its high position into its low position, means responsive to operation of said controller from its off position into its high position for preparing said mechanism, and means responsive to operation of said transducer for operating said prepared mechanism.

WILLIAM C. CLARK.

References Cited in the file of this patent

UNITED STATES PATENTS

| Number | Name | Date |
| --- | --- | --- |
| 2,031,919 | Bennett et al. | Feb. 25, 1936 |
| 2,402,163 | Huenergardt | June 18, 1946 |
| 2,492,865 | Huenergardt | Dec. 27, 1949 |
| 2,613,289 | Warner | Oct. 7, 1952 |